United States Patent [19]

Goscenski, Jr.

[11] Patent Number: 4,554,845

[45] Date of Patent: Nov. 26, 1985

[54] POSITIVE DRIVE AND SECONDARY CLUTCH MEANS THEREFOR

[76] Inventor: Edward J. Goscenski, Jr., 2267 Gethings Rd., Battle Creek, Mich. 49017

[21] Appl. No.: 538,030

[22] Filed: Sep. 30, 1983

Related U.S. Application Data

[63] Continuation-in-part of Ser. No. 432,192, Oct. 1, 1982, abandoned.

[51] Int. Cl.[4] .................... F16H 35/04; F16D 19/00
[52] U.S. Cl. .................................. 74/650; 192/93 A
[58] Field of Search ............... 74/650, 710, 710.5, 74/711; 192/93 A, 54

[56] References Cited

U.S. PATENT DOCUMENTS

| | | | |
|---|---|---|---|
| 1,111,728 | 9/1914 | Besserdich et al. | 74/711 |
| 1,477,310 | 12/1923 | Cartwright | 74/650 |
| 1,477,311 | 12/1923 | Cartwright | 74/650 |
| 2,060,558 | 11/1936 | De Lavaud | 74/650 |
| 2,179,923 | 11/1939 | De Lavaud | 74/650 |
| 2,650,507 | 9/1953 | Clintsman | 74/711 |
| 2,978,929 | 4/1961 | Roberts | 74/711 |
| 3,097,545 | 7/1963 | Immel | 74/711 |
| 3,246,539 | 4/1966 | Ritter | 74/650 |
| 3,611,833 | 10/1971 | Baremor | 74/711 |
| 3,614,717 | 10/1971 | Boersma et al. | 339/262 R |
| 3,628,399 | 12/1971 | Seitz | 74/711 |
| 3,831,462 | 8/1974 | Baremoor | 74/711 |
| 4,265,143 | 5/1981 | Goscenski et al. | 74/710.5 |
| 4,389,909 | 6/1983 | Goscenski | 74/711 |
| 4,400,996 | 8/1983 | Schou | 74/710.5 X |
| 4,441,597 | 4/1984 | Teraoka | 192/54 X |

FOREIGN PATENT DOCUMENTS

| | | | |
|---|---|---|---|
| 57-134045 | 8/1982 | Japan | 74/711 |
| 1004689 | 9/1965 | United Kingdom | 74/710.5 |

Primary Examiner—Rodney H. Bonck
Assistant Examiner—Stephen B. Andrews

[57] ABSTRACT

A positive drive is disclosed of the type including an input (11,13,21) and a pair of outputs (27,29) in which torque is transmitted from the input to the outputs by means of a pair of drive coupled members (23 and 25) and clutch assemblies (35 and 37). In order to frictionally dampen any undesirable oscillations to the input relative to the outputs, each of the clutch assemblies includes inactive clutch discs (61 and 63). It is one important feature of the invention to increase the net clearance, i.e., the amount of rotational movement of the input relative to the outputs over which frictional dampening occurs. If additional biasing preload is required for the inactive discs only, a separate biasing spring (71,73) may be added for each of the clutch assemblies.

17 Claims, 5 Drawing Figures

POSITIVE DRIVE AND SECONDARY CLUTCH MEANS THEREFOR

CROSS-REFERENCE TO RELATED APPLICATION

This application is a continuation-in-part of U.S. application Ser. No. 432,192, filed Oct. 1, 1982, and now abandoned.

BACKGROUND OF THE DISCLOSURE

The present invention relates to traction modifiers, and more particularly, to positive drives including secondary clutch means.

Traction modifing devices have become popular for use in vehicles, in the drive train between the vehicle transmission and the driven wheels. The primary function of a traction modifier is to facilitate driving on slippery surfaces and off-road conditions. These devices are especially useful where one of the driven wheels momentarily has less traction than the other driven wheel.

Traction modifying devices are generally categorized in three classes:
1. Limited slip differentials such as illustrated in U.S Pat. Nos. 3,611,833 (nonbiased), and 3,614,717 (spring biased);
2. Locking differentials such as illustrated in U.S. Pat. Nos. 1,111,728 (manually actuated), 2,978,929 (hydraulically operated), and 3,831,462 (speed responsive); and
3. Positive drives such as illustrated in U.S. Pat. Nos. 1,477,311; 2,060,558; and 2,179,923.

In general, a positive drive includes an input member adapted to be driven by the input driving torque transmitted from the power source and first and second output members adapted to drive the vehicle wheels. First and second clutch means are operably associated with the first and second output members, respectively, and each of the clutch means has a disengaged mode and an engaged mode. In the disengaged mode of each clutch means, its respective output member rotates relative to the input member, while in the engaged mode, the output member is maintained in a predetermined rotational relationship with the input member. First and second cam means are operably associated with the first and second clutch means, respectively to move the respective clutch means from the disengaged mode to the engaged mode in response to movement of the cam means from a neutral position to an actuated position.

During straight driving movement of a vehicle employing a positive drive, engine power is transmitted approximately equally to the driven wheels, which rotate at the same speed. During a potential spin-out condition (e.g., one wheel on ice and the other on pavement), engine power is transmitted to the driven wheels in proportion to their instantaneous traction limitations, whereby the wheels are still driven at the same speed.

When the vehicle turns a tight corner, power is transmitted only to the slower moving wheel, while the faster moving wheel is permitted to free-wheel, relative to the input. When the vehicle is making a gradual turn, the positive drive transmits slightly more torque to the inside wheel than to the outside wheel. Thus, a positive drive performs in a manner similar to an open differential during operating conditions which would make an open differential desirable, and performs in a manner similar to a rigid axle when operating conditions would make a rigid axle desirable.

An important distinction between positive drives and locking differentials is that in a locking differential, the side gears are interconnected by the pinions, and when the single clutch is actuated to lock one side gear to the case, both side gears are effectively locked to the case. In addition, lockup of a locking differential normally occurs only in response to a predetermined speed differential between the two outputs (side gears). In contrast, a positive drive includes two clutches, either of which may be engaged independently of the other. In addition, engagement of the clutches is the means of torque transmission in the normal drive mode, and when there is a speed differential between the two outputs, only the clutch transmitting torque to the slower turning wheel is engaged.

Although the independent actuation of the clutches of a positive drive provides better operating characteristics than other forms of traction modifiers, under most operating conditions, one operating condition has been identified in which the independent actuation of the clutches may result in an undesirable performance characteristic.

It has been discovered that when a vehicle utilizing a manual clutch transmission is in a tight turn, in low gear, and the clutch is suddenly disengaged, it is possible for the positive drive unit to oscillate between two different conditions:
(1) The input drives the inside (slower turning) wheel while the outside wheel turns freely; and
(2) The input retards the rotation of the outside (faster turning) wheel while the clutch driving the inside wheel becomes disengaged. Thus, the input of the positive drive oscillates between a driving condition and a braking condition and causes a characteristic referred to as "shudder." This condition will be described in greater detail in connection with the description of the preferred embodiments.

SUMMARY OF THE INVENTION

Accordingly, it is an object of the present invention to provide a positive drive which substantially eliminates the occurrence of oscillation between a driving condition and a braking condition.

It is another object of the present invention to provide a positive drive which accomplishes the above-stated object without substantially impairing any of the desirable operating characteristics of positive drives.

The above and other objects of the invention are accomplished by the provision of an improved positive drive of the type described above in which each of the first and second clutch means includes a primary clutch which, in the engaged mode, is operable to transmit torque from the input member to the respective output member, and a secondary clutch which, in the engaged mode, or in the disengaged mode of the primary clutch is operable to transmit torque directly from the input member to the respective output member during relative movement therebetween. Also included is means for exerting a torque preload on each of the first and second secondary clutches. The net rotational clearance of each of said secondary clutches is selected such that the product of the torque preload and the net rotational clearance provides a predetermined rotational dampening between the input member and each of the output members in response to relative rotational movement therebetween.

DESCRIPTION OF THE PREFERRED EMBODIMENTS

Figure 1:
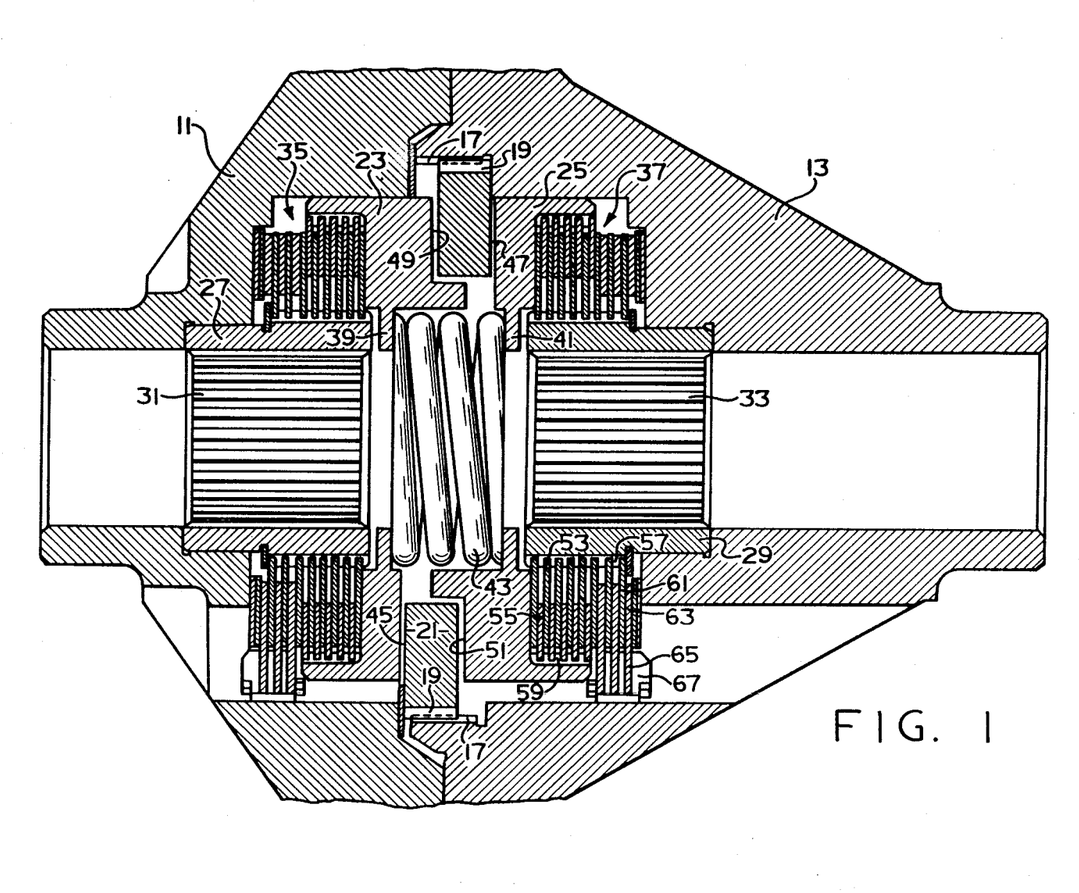
FIG. 1 is an axial cross section of a preferred embodiment of a positive drive made in accordance with the present invention.

Referring now to the drawings, which are not intended to limit the present invention, FIG. 1 shows a positive drive of the type with which the present invention may be utilized. The positive drive includes a housing comprising a left housing portion 11 and a right housing portion 13, which are shown broken away in FIG. 1. As may be seen in FIGS. 2 and 4, the housing portions 11 and 13 cooperate to define a flange 15 to which a ring gear (not shown) may be bolted. Driving torque is transmitted from the vehicle engine, through the transmission and drive shaft, and through a bevel gear to the ring gear, as is well known in the art.

The right housing portion 13 defines a set of internal splines 17, which are in splined engagement with a set of external splines 19 disposed about the outer periphery of a cam member 21. Disposed on opposite sides of the cam member 21 are a pair of drive coupling members 23 and 25. Supported for rotation within the housing portions 11 and 13 are a pair of output coupling members 27 and 29, respectively. The output coupling members 27 and 29 define sets of straight, internal splines 31 and 33, respectively, which are adapted to be in engagement with sets of external splines defined by left and right axle shafts (not shown).

Disposed between the drive coupling member 23 and output coupling member 27 is a clutch assembly 35, and disposed between the drive coupling member 25 and the output coupling member 29 is a clutch assembly 37. The drive coupling members 23 and 25 define inwardly-extending flange portions 39 and 41, and a compression spring 43 is seated between the flange portions 39 and 41, to exert an axial biasing force on the drive couplings 23 and 25, thereby preloading the clutch assemblies 35 and 37, as will be described in greater detail subsequently.

The cam member 21 defines a pair of opposite cam surfaces 45 and 47. The drive coupling member 23 defines a ramp surface 49, while the drive coupling 25 defines a ramp surface 51. Preferably, the cam and ramp surfaces are of the "rise and fall" type now well known in the art and illustrated in greater detail in previously cited U.S. Pat. No. 3,831,462, assigned to the assignee of the present invention and incorporated herein by reference. With rise and fall cam and ramp surfaces, rotation of the cam member 21 relative to the drive couplings 23 and 25 results in engagement of the cam surface 45 with the ramp surface 49 and the cam surface 47 with the ramp surface 51. Further rotation of the cam member 21 results in axial movement of the coupling 23 to the left in FIG. 1, and of coupling 25 to the right in FIG. 1. It is the axial movement of each of the drive coupling members 23 or 25 which results in the respective clutch assembly 35 or 37 going from its disengaged mode to its engaged mode.

Referring now specifically to the clutch assemblies 35 and 37, it should be noted that these assemblies are substantially identical in construction and function, and therefore, it will be understood that the subsequent detailed description of the clutch assembly 37 applies equally to the clutch assembly 35.

The clutch assembly 37 includes a plurality of alternately interleaved clutch discs 53 and 55. The clutch discs 53 are in splined engagement with a set of external splines 57 defined by the output coupling member 29, while the clutch discs 55 are in splined engagement with a set of internal splines 59 defined by the drive coupling member 25. The clutch discs 53 and 55 may be considered "active" discs, because it is the number, size, characteristics, etc., of these discs which determine the basic shape of the torque vs. time curve associated with the operation of the clutch assembly 37 and cam means 21, 25, 47, 51.

Invention—FIG. 1

During the development of a positive drive which would be commercially acceptable, testing of a vehicle equipped with a positive drive resulted in the discovery of the "shudder" condition referred to in the background of the specification. As stated in the background, the shudder condition was found to occur in a vehicle utilizing a manual clutch transmission, operating in low gear (either forward or reverse), and making a tight turn. The shudder condition was observed to occur only upon the sudden disengagement of the vehicle clutch, a factor which became important in the development of the invention, as will be described subsequently.

The next step in the development of the present invention was to determine what occurs in the positive drive during the shudder condition. It was eventually determined that the shudder condition involves oscillation of the input (housing portions 11 and 13 and cam member 21) between two different conditions. Referring still to FIG. 1, and assuming a lefthand turn is occuring, the cam surface 45 is in engagement with the ramp surface 49, actuating the clutch assembly 35, while the cam surface 47 and ramp surface 51 are in a relative neutral condition. Thus, the clutch assembly 37 is in its disengaged mode, and the right axle shaft and right wheel are free to rotate faster than the input to the positive drive. If the transmission clutch is suddenly disengaged by the operator, there is no longer a driving torque transmitted to the cam member 21. As a result the cam member 21 may move from its former position, with the cam surface 45 engaging the ramp surface 49 to a "reverse" position with the reverse side of the cam surface 47 engaging the ramp surface 51. At the same time, the cam surface 45 and ramp surface 49 are now in a neutral position and the clutch assembly 35 is momentarily in its disengaged mode.

Initially, the reasons for the movement of the cam member 21 were unknown, but it was eventually determined that such movement is initiated partly because the vehicle drive shaft is subjected to torque wind-up prior to disengagement of the transmission clutch. After the clutch is disengaged, the drive shaft is free to unwind and the drive shaft and output portion of the transmission clutch act as an oscillating spring-mass system. It was then determined that this movement of the cam member 21 to the reverse ramp condition results in momentary engagement of the clutch assembly 37, such that the input effectively retards rotation of the right axle shaft and wheel which were turning faster than the input. As a result of the oscillation of the drive shaft and transmission clutch (i.e., the spring-mass system), the input continues to oscillate between the two conditions described above.

Once it was determined that the shudder condition was intiated and propagated by oscillation within the drive train, it was seemingly obvious that the solution to the shudder problem would involve dampening of the oscillations, or modifying the transmission clutch in some manner to prevent it from oscillating. For example, reducing the size and/or weight of the transmission clutch would reduce the oscillations, or dampening the oscillations within the clutch would also eliminate the shudder. It was also recognized that dampening oscillation of the housing of the positive drive, relative to the vehicle frame would eliminate shudder. However, none of these obvious solutions were a practical solution to the shudder problem, especially for a manufacturer of the positive drive. It became apparent that it would be desirable to dampen the oscillations within the positive drive, rather than external thereto.

The next step in the development of the present invention was the recognition that in a typical positive drive of the type described herein, there are oscillations occurring between the cam member 21 and the drive coupling members 23 and 25. This is true despite the fact that it had become accepted practice to strive to minimize "clearance" in the positive drive. For purposes of the present invention, "clearance" is defined as the number of degrees of rotational movement of the input (cam member 21) relative to the outputs in going from a forward drive condition to a reverse drive condition. Thus, the "optimum" positive drive was believed to be the one having a clearance approaching zero, such that there would be no excessive lost motion within the unit. However, as stated above, it is one aspect of the present invention to recognize that such oscillations do in fact occur, and to determine that such oscillations could be the basis for providing dampening within the positive drive to prevent shudder.

Therefore, in accordance with another aspect of the present invention, dampening discs were added to each of the clutch assemblies 35 and 37, to frictionally dampen relative movement between the input and the outputs. In the embodiment of FIG. 1, the clutch assembly 37 includes a plurality of clutch discs 61 in splined engagement with the external splines 57, and a plurality of clutch discs 63. The clutch discs 63 are fixed relative to the housing portion 13 by means of a plurality of clutch ears 65, integral with each of the discs 63, each of the ears 65 being received in a generally semi-circular ear guide 67, as is shown generally in FIG. 3. It is believed that this particular arrangement for retaining the clutch discs 63 is well known in the art and requires no further explanation. It should be understood that, within the scope of the present invention, the dampening discs 61 and 63 could be located differently than shown in FIG. 1, and the arrangement and location shown in FIG. 1 is by way of example only.

It was discovered that an important feature related to the use of dampening discs 61 and 63 is the provision of a greater "clearance" within the positive drive, contrary to the previous design objectives referred to above. The purpose of providing the increased clearance is to permit a greater amount of relative rotational movement, and frictional dampening, between the clutch discs 61 and the clutch discs 63. It should be noted that dampening is expressed in foot-pound-degrees, and therefore, the total amount of dampening is directly proportional to the degrees of relative rotation of the discs 61 and 63.

In the embodiment of FIG. 1, it should be noted that the compression spring 43 exerts a continuous preload on each of the clutch assemblies 35 and 37, such that there is a slight amount of frictional engagement between the clutch discs 61 and 63 at all times. The preload exerted by the spring 43 results in a certain amount of torque (in foot-pounds) being required to move the discs 61 relative to the discs 63. Therefore, the spring 43 may be considered as exerting a torque preload on the discs 61 and 63, and the dampening which occurs is a product of the torque preload (in foot-pounds) and the clearance (in degrees). As a practical matter, the amount of frictional dampening required for a given positive drive design and a given vehicle installation is determined emperically. Based upon this determination of dampening required, the clearance of the positive drive, and the torque preload can then be selected to provide the desired dampening.

However, in accordance with another aspect of the present invention it was discovered that in some cases, the addition of the dampening discs 61 and 63 did not provide sufficient dampening to eliminate shudder, and in some cases, provided no dampening at all. It was subsequently determined that one reason for the occasional inability to dampen relates to the clearance. It was discovered that, although the clearance of the device may be in the range of 2 degrees, any "looseness" in the fit between the clutch discs 61 and splines 57, and between the ears 65, ear guides 67, and housing 13 may be substantial, and therefore must be subtracted from the "clearance" to determine a "net clearance". It is this net clearance which must be multiplied by the torque bias to obtain the actual frictional dampening. For example, if the clearance was designed to be 2 degrees, but the "looseness" were approaching 2 degrees also, the net clearance would be approaching zero. A factor in regard to looseness is to attempt to minimize the looseness by reducing the tolerances between the splines, etc. However, it is most important for the looseness to be known and predictable, within normal manufacturing tolerance levels. Once the amount of looseness is known, it is then possible to increase the clearance of the device to obtain a "net clearance" which will provide the desired frictional dampening.

In the embodiment of FIG. 1, the dampening discs 61 and 63 are included in the clutch assembly 37 in a manner whereby the clutch discs 61 and 63 serve as "inactive" discs. As inactive discs, the discs 61 and 63 contribute to the total torque transmitting capacity of the clutch assembly 37, but do not effect the basic torque vs. time relationship of the clutch and cam means.

By way of summary of the above-described steps or aspects of the present invention, it should be noted that increasing the clearance within the positive drive was considered contrary to desirable design practices. In addition, it has been considered undesirable in positive drive design to utilize very much biasing preload on the clutch assemblies, because excess preload on the clutch assemblies would partly negate certain desirable operating characteristics of a positive drive. Finally, it is considered undesirable from the standpoint of manufacturing cost to attempt to control the looseness of the dampening discs 61 and 63. Despite the undesirability of the three design parameters mentioned, it is a feature of the present invention to utilize a certain acceptable amount of each of these generally undesirable parameters, in combination, to achieve a predetermined amount of frictional dampening, and eliminate shudder.

FIG. 2

Figures 2, 3:
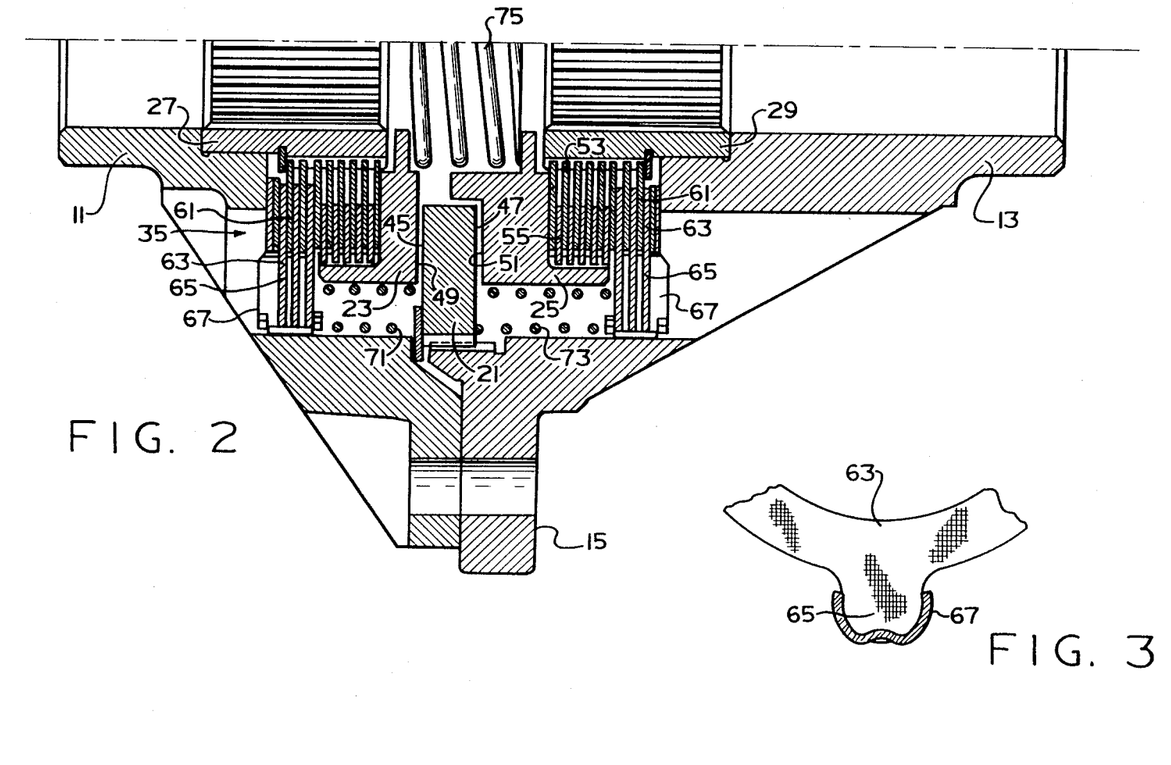
FIG. 2 is a one-half axial section of an alternative embodiment of the invention.
FIG. 3 is an enlarged, fragmentary transverse cross section viewing the spring, ear, and ear guide of FIG. 2.

Referring now to FIG. 2, there is shown an alternative embodiment of the present invention, in which the same elements bear the same numerals, and new or substantially different elements bear numerals in the 70s. In the embodiment of FIG. 1, it was necessary to increase the net clearance, in order that the preload exerted by the spring 43 not be excessive. This is true partly because in the FIG. 1 embodiment, the spring 43 is applying a preload not only to the inactive discs 61 and 63, but also to the active discs 53 and 55. In certain design situations, it may not be desirable to reduce the looseness and increase the net clearance enough to achieve the desired frictional dampening. In the embodiment of FIG. 2, it may be seen that in the clutch assembly 35, a spring 71 is seated against the cam member 21 and also against the ears 65 of the inactive clutch discs 63. Similarly, in the clutch assembly 37, a spring 73 is seated against the cam member 21, and also against the ears 65 of the inactive discs 63. In addition, the compression spring 43 has been replaced by a spring 75 which exerts a biasing preload against the clutch assemblies 35 and 37 as was described in connection with FIG. 1. However, in the FIG. 2 embodiment, the springs 71 and 73 exert an additional biasing preload, but only on the inactive discs 61 and 63 to thereby increase the frictional dampening, without adversely effecting the operating characteristics of the positive drive.

FIG. 4

Figure 4:
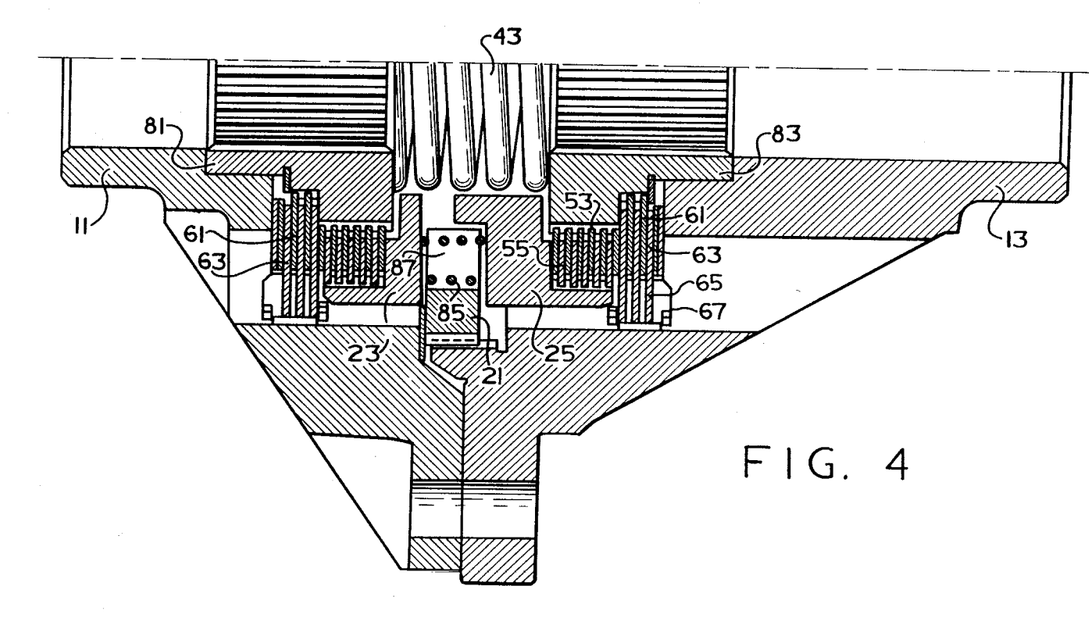
FIG. 4 is a one-half axial section, similar to FIG. 2, illustrating another alternative embodiment of the invention.

Referring now to FIG. 4, there is shown another alternative embodiment of the present invention in which the same elements bear the same numerals as in FIGS. 1 and 2, and new or substantially modified elements bear numerals in the 80s. In the FIG. 4 embodiment, as in the FIG. 2 embodiment, the intention is to apply an additional biasing preload to the inactive clutch discs 61 and 63, in addition to that applied to the entire clutch assemblies 35 and 37. In the FIG. 4 embodiment, the drive coupling members 23 and 25 are biased axially to apply a biasing preload to the clutch assemblies 35 and 37, respectively. However, in this embodiment, the main biasing preload is applied by one or more compression springs 85 each of which extends axially through a cutout portion 87 defined by the cam member 21. This embodiment includes modified output coupling members 81 and 83, which are biased axially by the compression spring 43. Each of the output coupling members 81 and 83 is configured to engage the inactive discs 61 and 63 of the clutch assemblies 35 and 37, respectively. Therefore, in the FIG. 4 embodiment, the compression spring 43, instead of exerting the main biasing preload, exerts the additional preload to the inactive discs 61 and 63.

FIG. 5

Figure 5:
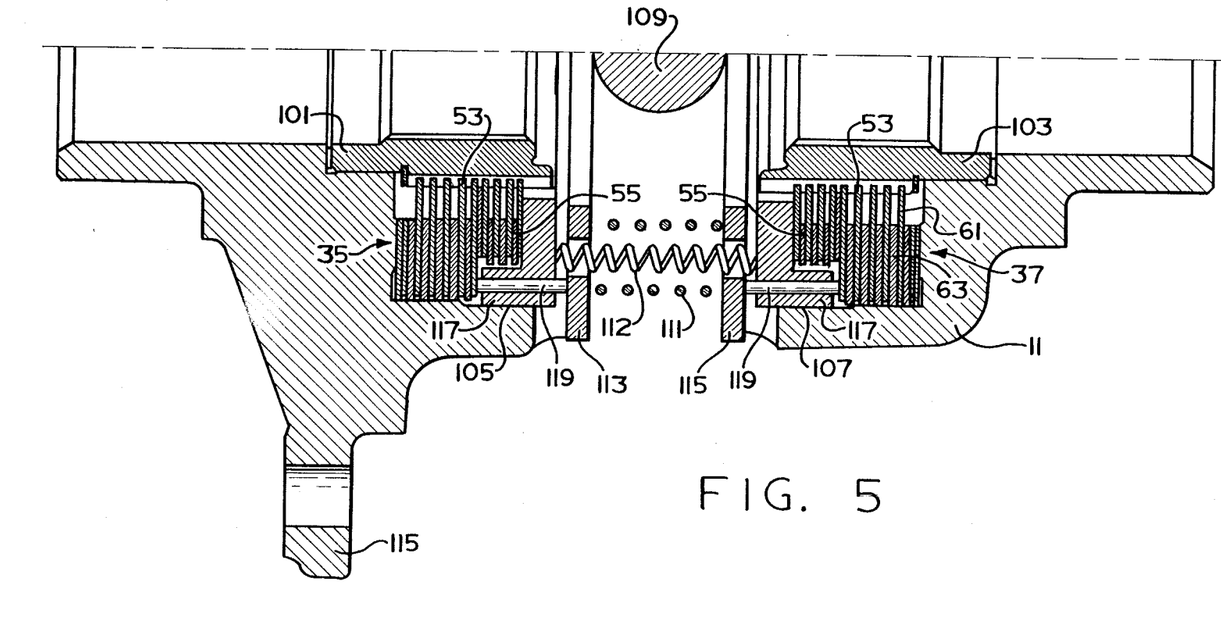
FIG. 5 is a one-half axial section, similar to FIG. 2, illustrating still another alternative embodiment of the invention.

Referring now to FIG. 5, there is shown still another alternative embodiment of the present invention in which the same elements bear the same numerals as in FIGS. 1, 2, and 4, and new or substantially modified elements bear numerals in excess of 100. In the FIG. 5 embodiment, as in the FIG. 2 embodiment, the intention is to apply an additional biasing preload to the inactive clutch discs 61 and 63, in addition to that applied to the entire clutch assemblies 35 and 37.

In the FIG. 5 embodiment, the overall configuration of the positive drive differs somewhat from the configuration shown in FIGS. 1, 2, and 4. The overall configuration of the FIG. 5 embodiment may be better understood by reference to copending U.S. application Ser. No. 355,971, filed Mar. 8, 1982, in the name of Edward J. Goscenski, Jr., for a "Single Shaft Positive Drive" which is incorporated herein by reference.

The FIG. 5 embodiment includes a pair of output coupling members 101 and 103, and a pair of drive coupling members 105 and 107. The couplings 105 and 107 further include cam surfaces (not shown), disposed to engage mating cam surfaces (also not shown) which are disposed on a shaft 109.

Preloaded springs 111 contact at each end a pair of identical spring plates 113 and 115, and disposed within each of the springs 111 is a spring 112 which passes through openings in the plates 113 and 115. The springs 112 directly engage the drive coupling members 105 and 107 to apply the "active" preload thereto.

Each of the couplings 105 and 107 includes a radially outward, axially-extending projection 117, which is disposed adjacent the inactive discs 61 and 63. Each of the projections 117 defines an axially-extending opening which receives a pin member 119. Each of the pins 119 engages, at its inner end, the adjacent spring plate 113 or 115, and engages at its outer end, the inactive discs 61 and 63. As a result of this arrangement, the compressive preload ("inactive" preload) of the springs 111 is transmitted by means of the spring plates 113 and 115 and the pins 119 to the inactive discs 61 and 63, thus exerting the required additional preload to the inactive discs.

The present invention has been described in detail sufficient to enable one skilled in the art to practice the same. Upon a reading and understanding of the specification, certain modifications and alterations of the invention will become apparent to those skilled in the art, and it is intended that the invention include all such modifications and alterations, insofar as they come within the scope of the appended claims.

I claim:

1. In a positive drive of the type including an input member adapted to be driven by input driving torque transmitted from a power source, first and second output members adapted to drive first and second output shafts, first and second clutch means operably associated with said first and second output members, respectively, each of said clutch means having a disengaged mode which allows its respective output member to rotate relative to said input member when said respective output member is rotating at an angular velocity in the direction of torque transmittal that is greater than one predetermined angular velocity condition of the output members, and an engaged mode which maintains a predetermined rotational relationship between said respective output member and said input member when said respective output member is rotating at an angular velocity in the direction of torque transmittal that is equal to or less than another predetermined angular velocity condition of the output members, first and second means operably associated with said first and second clutch means, respectively, to move the respective clutch means from said disengaged mode to said engaged mode, characterized by:
  (a) at least one of said first and second clutch means including a primary clutch operable, in the engaged mode, to transmit torque from said input member to the respective output member, and a secondary clutch operable, in either the engaged or disengaged mode of said primary clutch, to transmit torque from said input member to the respective output member during relative rotation between said input and the respective output member;
  (b) means for exerting a torque preload on said secondary clutch; and
  (c) the net rotational clearance of said secondary clutch, relative to said input member, being selected such that the product of said torque preload and said net rotational clearance provides a predetermined rotational dampening between said input member and each of said output members in response to relative rotational movement therebetween.

2. A positive drive as claimed in claim 1 wherein each of said primary clutches comprises a plurality of friction disc elements, a portion of said elements being in engagement with the respective output member, and alternate ones of said elements being operably associated with respective means for moving the clutch.

3. A positive drive as claimed in claim 2 including a housing fixed relative to said input member, wherein said secondary clutch comprises a plurality of friction disc elements, a portion of said elements being in engagement with the respective output member, and alternative ones of said elements being in engagement with said housing.

4. A positive drive as claimed in claim 3 wherein said friction disc elements comprising said primary clutch and said friction disc elements comprising said secondary clutch are axially disposed such that said means for exerting a torque preload on said secondary clutch also exerts a torque preload on said primary clutch.

5. A positive drive as claimed in claim 4 wherein said means for exerting a torque preload on said secondary clutch includes one biasing means exerting a torque preload on both said primary and said secondary clutch, and another biasing means exerting a torque preload on only said secondary clutch.

6. A positive drive as claimed in claim 5 wherein said another biasing means comprises spring means and a plurality of elongated, rigid members extending axially between said spring means and said secondary clutch, and operable to transmit a biasing force from said spring means to said secondary clutch.

7. In a positive drive of the type including an input member adapted to be driven by input driving torque transmitted from a power source, first and second output members adapted to drive first and second vehicle wheels, first and second clutch means operably associated with said first and second output members, respectively, each of said clutch means having a disengaged mode which allows its respective output member to rotate relative to said input member when said respective output member is rotating at an angular velocity in the direction of torque transmittal that is greater than one predetermined angular velocity condition of the other output member, and an engaged mode which maintains a predetermined rotational relationship between said respective output member and said input member when said respective output member is rotating at an angular velocity in the direction of torque transmittal that is equal to or less than another predetermined angular velocity condition of the other output member, first and second cam means operably associated with said first and second clutch means, respectively, to move the respective clutch means from said disengaged mode to said engaged mode in response to movement of the respective cam means from a neutral position to an actuated position, characterized by:
  (a) each of said first and second clutch means including a primary clutch operable, in the engaged mode, to transmit torque from the respective cam means to the respective output member, and a secondary clutch operable, in either the engaged mode or the disengaged mode of the primary clutch, to transmit torque directly from the input member to the respective output member;
  (b) means for exerting a torque preload on each of said first and second secondary clutches; and
  (c) the net rotational clearance of each of said secondary clutches, relative to said input member, being selected such that the product of said torque preload and said net rotational clearance provides a predetermined rotational dampening between said input member and each of said output members during relative rotational movement therebetween.

8. A positive drive as claimed in claim 7 wherein each of said cam means comprises a cam surface defined by said input member and an adjacent coupling member which is axially movable, to move the respective clutch means to said engaged mode, in response to relative rotational movement between said input member and said coupling member.

9. A positive drive as claimed in claim 8 wherein each of said primary clutches comprises a plurality of friction disc elements, a portion of said elements being in engagement with the respective output member, and alternate ones of said elements being in engagement with the respective coupling member.

10. A positive drive as claimed in claim 9 including a housing, wherein each of said secondary clutches comprises a plurality of friction disc elements, a portion of said elements being in engagement with the respective output member, and alternate ones of said elements being in engagement with said housing.

11. A positive drive as claimed in claim 10 wherein said friction disc elements comprising said primary clutch and said friction disc elements comprising said secondary clutch are axially aligned with the respective coupling member.

12. A positive drive as claimed in claim 11 wherein said means for exerting a torque preload comprises a compression spring seated, at its opposite ends, against said first and second coupling members to bias said coupling members axially away from each other, and exert a torque preload on each of said primary clutches and each of said secondary clutches.

13. A positive drive as claimed in claim 12 wherein said means for exerting a torque preload includes another biasing means exerting a torque preload on only said secondary clutches.

14. A positive drive as claimed in claim 7 including a housing, wherein each of said secondary clutches comprises a plurality of friction disc elements, a portion of said elements being in engagement with the respective output member, and alternate ones of said elements being in engagement with said housing, said friction disc elements comprising said secondary clutch being axially aligned with the respective coupling member.

15. A positive drive as claimed in claim 14 wherein said means for exerting a torque preload comprises a compression spring seated, at its opposite ends, against said first and second coupling members to bias said coupling members axially away from each other, and exert a torque preload on each of said primary clutches and on each of said secondary clutches, said means for exerting a torque preload including another biasing means exerting a torque preload only on said secondary clutches.

16. A positive drive as claimed in claim 15 wherein said another biasing means comprises another compression spring and a plurality of elongated, rigid members extending axially from said another compression spring to said secondary clutches, and operable to transmit said torque preload from said another compression spring to said secondary clutches.

17. A positive drive as claimed in claim 16 wherein each of said coupling members defines an axially-extending opening, each of said elongated, rigid members passing through one of said openings.

* * * * *

UNITED STATES PATENT AND TRADEMARK OFFICE
CERTIFICATE OF CORRECTION

PATENT NO. : 4,554,845

DATED : November 26, 1985

INVENTOR(S) : Edward J. Goscenski, Jr.

It is certified that error appears in the above–identified patent and that said Letters Patent are hereby corrected as shown below:

Title page:

At [73] please insert "Assignee: Eaton Corporation, Cleveland, Ohio".

Signed and Sealed this

Twenty-first Day of October, 1986

[SEAL]

Attest:

DONALD J. QUIGG

Attesting Officer     Commissioner of Patents and Trademarks